Patented July 3, 1951

2,558,949

UNITED STATES PATENT OFFICE 2,558,949

POLYMERIC POLYETHER POLYHYDRIC ALCOHOLS

Sylvan Owen Greenlee, Louisville, Ky., assignor to Devoe & Raynolds Company, Inc., Louisville, Ky., a corporation of New York No Drawing. Application September 18, 1945, Serial No. 617,178

4 Claims. (Cl. 260—47)

This invention relates to new polymeric polyhydric alcohols prepared by the reaction of polyhydric phenols with polyhalo alcohols, or epihalohydrins, together with monohalohydrins, with regulation of the proportions and degree of polymerization to form polymeric polyhydric alcohols having both intermediate and terminal alcoholic hydroxyl groups.

The new polymeric-polyhydric alcohols are very useful for esterification with organic acids to form esters suitable for use as plasticizers, drying compositions, etc. depending upon the type of organic acids used. They are thus useful in preparing drying compositions such as described in my prior application Serial Number 502,317 filed September 14, 1943, Patent No. 2,456,408, granted December 14, 1948 of which application this application is a continuation in part. The complex polyhydric alcohols are also useful for other purposes than esterification, and particularly where a polyhydric alcohol of unusually high molecular weight and with a large number of hydroxyl groups is desired. They are thus particularly advantageous for reaction with polyfunctional cross-linking reactants which react with hydroxyl groups to form resinous products useful in the paint and varnish industry, or for producing molded products which with suitable cross-linking reactants are infusible products.

In preparing the new polymeric polyhydric alcohols three reacting ingredients are used; namely, a polyhydric phenol, a hydroxyl contributing difunctional reagent which will react with polyhydric phenol, e. g., a dihalohydrin, or an epihalohydrin, and a monofunctional reactant which will react with the phenol to form end components with one or more hydroxyl groups.

The polyhydric phenols used in making the new polymeric polyhydric alcohols may be mononuclear as resorcinol, hydroquinone, catechol, phloroglucinol, etc., or polynuclear, such as bis phenol (p,p'-dihydroxydiphenyl dimethyl methane), p,p'-dihydroxyphenone, p,p'-dihydroxydiphenyl, p,p'-dihydroxydibenzyl, o,p,o',p'-tetrahydroxydiphenyl dimethyl methane, hematoxylin, polyhydric anthracenes, polyhydric naphthalenes, etc. Bis phenol is particularly advantageous for use in making the new polymeric polyhydric alcohols.

The polyfunctional alcohol-contributing reactant may be an epihalohydrin, such as epichlorhydrin, epibromhydrin, epihalohydrins of mannitol, sorbitol, erythritol, etc.; a polyhalohydrin such as glycerol dichlorhydrin, betamethyl glycerol dichlorohydrin, mannitol or sorbitol dichlorhydrin, etc.

The monofunctional reactant which contributes terminal hydroxyl groups to the polymeric polyhydric alcohol may be a monohalohydrin such as ethylene chlorhydrin, glycerol monochlorhydrin, erythritol monochlorhydrin, mannitol or sorbitol monochlorhydrin, etc.

The proportions of the different reactants are regulated and controlled to give polymeric polyhydric alcohols of predetermined molecular weights or average molecular weights and predetermined hydroxyl group content.

The proportions of the reactant are such that a larger equivalent proportion is used of the polyhydric phenol than of the polyfunctional hydroxyl contributing reactant, and with a proportion of monofunctional reactant sufficient to react with the excess of phenolic hydroxyls to give hydroxyl-containing end components. Thus with a dihydric phenol and a difunctional alcohol-contributing reactant the proportion of dihydric phenol will be greater than equivalent proportion of difunctional reactant, and the proportion of monofunctional reactant will be sufficient to make up for the difference so that the polyhydric phenol will be completely reacted, and so that the polymeric polyhydric alcohol will contain hydroxyl-containing residues of the difunctional reactant intermediate the dihydric phenol residues, and terminal hydroxyl-contributing residues form the monovalent reactants at the ends of the polymeric chain.

The polymeric polyhydric alcohols may be considered as having the following general formula or structure when a dihydric phenol is used with difunctional and monofunctional alcohol contributing reactants

$$R_3-[O-R-O-R_1-]_nO-R-O-R_3$$

in which R is the residue of the dihydric phenol, $R_1$ is the residue of the difunctional hydroxyl-contributing reactant, $R_3$ is the residue of the monofunctional hydroxyl-contributing reactant, and in which $n$ represents the extent of the polymerization.

In the polymeric polyhydric alcohols such as illustrated by the above formula or structure, where $R_1$ is the residue of epichlorhydrin or glycerol dichlorhydrin it will contain one hydroxyl group. Where $R_3$, the end component, is derived e. g. from ethylene chlorhydrin or ethylene oxide it will contain one hydroxyl group; while if derived e. g., from glycerol monochlorhydrin or glycidol it will contain two hydroxyl groups.

The proportion of the reactants and the degree of polymerization can be regulated to give polymeric polyhydric alcohols with predetermined number of hydroxyl groups e. g. up to 15 or 20 hydroxy groups per molecule or more.

The above formula illustrates polymeric polyhydric alcohols made from dihydric phenols and difunctional hydroxyl contributing reactants. If either of the polyfunctional reactants have a greater functionality than two, complex tridimensional or polydimensional polymers can be formed. Thus a trihydric phenol has three reactive phenolic groups which can react with the polyfunctional alcohol contributing reactant to give more complex polymeric products.

When a chlorhydrin is used as a polyfunctional or monofunctional reactant the reaction can readily be carried out with the use of aqueous caustic soda in sufficient amount to combine with all of the chlorine of the chlorhydrin or with an amount of alkali somewhat in excess of that amount.

The new polymeric polyhydric alcohols can be made in a single operation by adding the polyhydric phenol, the polyfunctional hydroxyl-contributing reactant and the monofunctional hydroxyl-contributing reactant at the outset. Thus where a dihydric phenol is used with epichlorhydrin or glycerol dichlorhydrin as difunctional reactant, and with a monochlorhydrin as the monofunctional reactant, the reactants can be added all at the outset and the reaction caused to take place with the addition of aqueous caustic alkali in sufficient amount to combine with all the chlorine of the chlorhydrins.

The new polymeric polyhydric alcohols may also be produced by successive operations and this is sometimes advantageous where high molecular polymers are desired and where halohydrins are used as the difunctional reactant. Thus a dihydric phenol can be first reacted with less than equivalent proportions of epichlorhydrin or glycerol dichlorhydrin to form an intermediate product having the desired number of phenolic residues and intermediate hydroxyl contributing residues, and this intermediate product freed from salt formed as a by-product and from any excess alkali by washing; and this intermediate product can be further reacted with the monofunctional reactant. If a monoepoxide is used as the monofunctional reactant this reaction is not accompanied by the formation of any by-products requiring removal from the product.

The invention will be further described in connection with the following examples and it will be understood that the invention is not limited thereto.

*Example I*

The production of a polymeric polyhydric alcohol from bis phenol, epichlorhydrin and glycerol monochlorhydrin was carried out as follows:

Three mols (684 parts) of bis phenol were dissolved in 1500 parts of water containing 4 mols (160 parts) of sodium hydroxide in an open varnish kettle. This solution was allowed to stand over night and then warmed up to 35° C. To this solution was added 2 mols (185 parts) of epichlorhydrin and 2 mols (221 parts) of glycerol monochlorhydrin. The reaction mixture was gradually heated with continued agitation to 90° C. At this stage 1.5 mols (60 parts) of sodium hydroxide was added and the reaction mixture was held at 90° C. for 2 hours with continued agitation. The upper alkaline salt solution was removed by decantation. The taffy like polymer was washed 4 times by agitating with boiling water, removing the wash water each time by decantation. The last traces of water were removed from the product by gradually heating to 180° C with agitation.

The softening point (Durran's Mercury Method) of the resulting resin was 106° C. The equivalent weight to esterification was determined by heating the product with linseed oil fatty acids in excess at 228° C. until a constant acid value was obtained, to give a value of 174.5.

*Example II*

The same reactants were used as in Example I but with a lower proportion of the monofunctional glycerol monochlorhydrin and a higher proportion of epichlorhydrin to obtain a polyhydric alcohol of a higher degree of polymerization:

Ten mols (2260 parts) bis phenol was dissolved in 5 liters of water containing 10.5 mols (420 parts) sodium hydroxide. To this solution was added 9.5 mols (879.5 parts) of epichlorhydrin and 1 mol (110.5 parts) of glycerol monochlorhydrin. With continued agitation the reaction mixture was heated to 125° C. over a period of 20 minutes. At this stage 5 mols (200 parts) of sodium hydroxide dissolved in water was added through a special separatory funnel adapted for adding the solution under pressure. The heating was continued for 45 minutes at 122° C. The reaction mixture was cooled to 100° C. and the upper water layer removed by decantation. The product was washed 4 times by agitation with water at 120–125° C. under pressure removing the water layer each time by decantation. The product was dried by heating until all of the water was removed. It had a softening point of 143° C.; and an equivalent weight to esterification of 270.

*Example III*

Ethylene chlorhydrin was used as the monofunctional reactant with bis phenol and epichlorhydrin as follows:

Four mols (912 parts) bis phenol were dissolved in 2 liters of water containing 4.8 mols (192 parts) sodium hydroxide in an open varnish kettle. This solution was cooled to 25–30° C. and with continued agitation 3.2 mols (296 parts) of epichlorhydrin and 1.6 mols (127 parts) of ethylene chlorhydrin were added. After agitating the reaction mixture at 50° C. for 1 hour, 1 mol (40 parts) sodium hydroxide was added and the reaction mixture heated to 100° C. and held at this temperature for 1 hour. The upper water layer was removed by decantation. The taffy like product was washed 4 times by agitation with boiling water, adding enough acetic acid during washing to neutralize any excess sodium hydroxide contained in the resin. The product was dried by heating with agitation. It had a softening point of 108° C.

The following table describes some of the polymeric polyhydric alcohols produced from this phenol and epichlorhydrin with the use of glycerol monochlorhydrin and ethylene chlorhydrin as the monofunctional reactants to control the molecular weight and number of hydroxyl groups of the product.

In the table "mol%" is used to designate the amount of epichlorhydrin used when the bis phenol is held constant at 100%. The "mol %" is arbitrarily taken as 100 when the difunctional reactants are used in equimolar proportions. For each mol deficiency (below 100%) of the difunctional reactant (epichlorhydrin), 2 mols of a monofunctional reactant was used to furnish end groups for the polymeric chain.

The large number of hydroxyl groups which may be present in these polymeric polyhydric alcohols enables a wide proportion of cross-linking bonds to be formed or even complex bonds between

| | Mol per cent epichlorhydrin used in deficiency | Monofunctional reactant used to furnish end groups | Average value of polymeric units ($n$) | Average No. of hydroxyl groups per molecule | Equivalent weight to esterification | Calculated average molecular weight | Softening point by Durran's Mercury Method |
|---|---|---|---|---|---|---|---|
| | | | | | | | °C. |
| 1 | 77.5 | Glycerol monochlorhydrin | 3.44 | 7.44 | 182.4 | 1,356 | 116.5 |
| 2 | 87.5 | ....do.... | 7 | 11 | 215 | 2,365 | 129 |
| 3 | 80 | Ethylene chlorhydrin | 4 | 6 | 242 | 1,458 | 106.5 |
| 4 | 83 | ....do.... | 4.9 | 6.9 | 247.5 | 1,705 | 116 |
| 5 | 85 | ....do.... | 5.67 | 7.67 | 252.4 | 1,938 | 119 |
| 6 | 90 | ....do.... | 9 | 11 | 261 | 2,871 | 129 |

Where epichlorhydrin is used as the polyfunctional reactant with bis phenol, each intermediate residue between the bis phenol nuclei will contain a single hydroxyl group; and where ethylene chlorhydrin is used as the monofunctional reactant, the terminal groups will contain a single hydroxyl group. In this case the number of hydroxyl groups will be one greater than the number of bis phenol residues in the polymeric polyhydric alcohol, and with a high degree of polymerization an unusually high molecular weight will result with a limited number of hydroxyl groups.

When glycerol dichlorohydrin is used as a difunctional reactant and glycerol monochlorhydrin as the monofunctional reactant, the terminal groups will contain two hydroxyl groups, and the number of hydroxyl groups will be three more than the number of bis phenol residues.

While the number of hydroxyl groups can be varied over a considerable range, particularly advantageous products are made with a higher degree of polymerization and a greater content of hydroxyl groups per molecule. Thus for producing polymeric polyhydric alcohols for esterification, the range may vary from 3 to 20 hydroxyls per molecule, and particularly advantageous products for esterification can be produced containing between 5 and 15 hydroxyls per molecule.

The new polymeric polyhydric alcohols are generally thick liquids or solid and in themselves have little value as film forming agents. They can, however, be converted into valuable film forming agents and into other compositions valuable for use in the paint and varnish industry and in making molding compositions and products.

In general the esters of the new polymeric polyhydric alcohols made with low molecular weight acids such as acetic acids and benzoic acid give brittle resins which are soluble in typical varnish constituents containing drying oils and are excellent resins for varnish manufacture. Esters of the new complex polymeric polyhydric alcohols with unsaturated acids such as those derived from unsaturated oils are excellent drying compositions. Esters derived from long chain saturated acids such as lauric, palmitic and stearic acids give wax-like products, useful as waxes and plasticizers. Many variations and types of useful products may be obtained by esterifying the new complex alcohols with various combinations of saturated and unsaturated, monobasic and polybasic and resin acids, or the anhydrides of such acids.

The new polymeric polyhydric alcohols are also valuable products for reaction with difunctional reactants which serve to cross-link different molecules through reaction with hydroxyl groups.

hydroxyl groups of the same molecule. With the higher polyhydroxy alcohols the amount of cross-linking reagents used may be far less than the equivalent for all of the hydroxyls present, for it is only necessary to effect sufficient cross-linking to form complex polydimensional reaction products e. g. such that an infusible product will be obtained. Among the cross-linking polyfunctional reactants which may be used are diisocyanates, e. g. methylene bis (4-phenyl) isocyanate, dialdehydes e. g. glyoxal, etc.

The new polymeric polyhydric alcohols are particularly valuable for use with polyepoxides as cross-linking agents. Diepoxides such as butylene diepoxides or bis (2,3 diepoxy propyl) ether can thus serve as difunctional cross-linking agents. The reaction between epoxide and hydroxyl groups takes place on heating, and particularly in the presence of an alkaline catalyst with the formation of ether linkages and without the formation of by-products, the reaction being a direct addition reaction.

The polymeric polyhydric alcohols, if the polymerization is not carried too far, are soluble in solvents such as acetone, methyl ethylketone, and diacetone alcohol, and can be used in solution for compounding with polyepoxides to make compositions suitab'e for use in making films, molding mixtures and compositions, etc.

It is sometimes advantageous to effect partial reaction of the complex polyhydric alcohols with polyepoxides to form intermediate products capable on further reaction of forming infusible products.

The proportions of monomeric polyhydric alcohols and polyepoxides can be varied. Primary alcoholic hydroxyl groups such as those at the ends of the polymeric polyhydric alcohols are in general more active in reacting with the polyepoxides than are secondary and tertiary alcohol hydroxyl groups. When the polyepoxides react with the primary terminal hydroxyl groups they tend to form straight chain polymers. Thus by using an amount of diepoxide equivalent to the terminal primary hydroxyl groups such that one epoxide group is provided for each primary hydroxyl group, reaction mixtures can be produced which can form complex straight chain polymers through reaction of terminal hydroxyl groups with epoxide groups.

The intermediate hydroxyl groups of the polyhydric polymeric alcoho's are also capable of reacting with polyepoxides and it is probable that such reaction takes place to a greater or less extent, particularly where the proportion of polyepoxide is in excess of that which corresponds to the terminal primary hydroxyl groups of the polymeric polyhydric alcohol. Such reaction of epoxide groups with intermediate hydroxyl groups gives polydimensional polymers and, where reaction takes place between the polyepoxides and both terminal and intermediate hydroxyl groups, complex polydimensional polymers are formed.

The amount of polyepoxide may be less than that which is equivalent to all of the terminal hydroxyl groups of the polymeric polyhydric alcohols, and, by regulating the proportions of polyepoxide and polyhydric alcohol, products can be obtained which are still fusible, as well as final products which are infusible where a sufficiently high proportion of polyepoxide is used.

Where a limited amount of polyepoxide is reacted with the polymeric polyhydric alcohols, or where with a larger proportion of polyepoxide the reaction between epoxide and hydroxyl groups is only partial, the resulting products can be esterified with organic acids much the same as higher polyhydric alcohols which are not reacted with polyepoxide. Thus where two molecular equivalents of a lower weight polymeric polyhydric alcohol are reacted with one equivalent of polyepoxide to produce a product which may be considered to have two molecules of the polyhydric alcohol united with one diepoxide through ether linkages formed from epoxide groups and terminal hydroxyl groups, the resulting product will have a molecular size somewhat more than twice that of the polymeric polyhydric alcohol used.

Where higher proportions of polyepoxide are used with the polymeric polyhydric alcohols, capable of reacting to form final infusible products, the reaction can advantageously be carried to an intermediate stage of reaction to give intermediate resinous compositions capable of use e. g. as molding resins or in forming molding compositions which on further heating are converted to infusible products.

In my companion application Serial No. 617,176, filed September 18, 1945, now abandoned, I have described complex polymeric epoxy-hydroxy compositions obtainable e. g. by the reaction of polyhydric phenols and polyfunctional chlorhydrins in proportions to give complex polymeric products containing terminal epoxide groups and terminal primary hydroxyl groups, with the proportion of terminal epoxy groups considerably in excess of the terminal primary hydroxy groups. Such complex epoxide compositions can also advantageously be compounded with the polymeric polyhydric alcohols in varying proportion to give polymerization or reaction products through reaction of epoxide groups and hydroxyl groups. By regulating proportions of polyhydric alcohol and polymeric epoxy-hydroxy products, products can be obtained which are fusible or with higher proportions of epoxide final infusible products, particularly when a small amount of alkali catalyst such as sodium phenoxide is used at high temperatures e. g. around 150° or 200° C.

In my companion application Serial No. 626,449, November 2, 1945, I have described complex polyepoxides resulting from the reaction of polyhydric phenols with polyepoxides and with the use of an excess of the polyepoxide to form complex reaction products in which the terminal groups are mainly or entirely epoxy groups. The complex polyhydric alcohols of the present invention can advantageously be compounded with the polyepoxides of said companion application to form new reaction products in which the epoxide groups of the polyepoxide compositions combine with hydroxyl groups of the polymeric polyhydric alcohols to form complex polymerization or reaction products. The reaction between epoxide and hydroxyl groups takes place without formation of by-products and by direct addition to form ether linkages. By using the complex polyhydric alcohols such as those of the preceding examples with the complex epoxide compositions such as those of the examples of said companion application, in proportions sufficient to bring about sufficient reaction of epoxide groups with terminal hydroxyl groups e. g. in equivalent proportions or with an excess of the polyepoxide, and on heating the resulting mixture with a small amount of a catalyst such as an alkali phenoxide, reaction products can be obtained which are infusible and valuable for use in making molding mixtures and for other purposes.

By varying the proportions of polymeric polyhydric alcohols and of the complex epoxy-hydroxy compositions or the complex polyepoxide compositions of said companion applications, a wide range of compositions and products can be obtained, varying from fusible resins to final infusible products.

Furthermore, the new complex polymeric polyhydric alcohols can be compounded with amounts of said complex epoxy-hydroxy compositions or complex polyepoxy compositions of said companion application together with varying amounts of simple diepoxides such as those hereinbefore referred to and the resulting mixture can be heated, particularly with a small amount of catalyst such as alkali phenolate catalyst, to bring about cross-linking of hydroxyl groups to the simple diepoxides as well as reaction between terminal epoxide groups of the complex epoxide compositions and hydroxyl groups of the polymeric polyhydric alcohols.

It will thus be seen that the new polymeric polyhydric alcohols are useful for various purposes, and particularly in the carrying out of reactions with other reactants where valuable reaction products can be obtained.

I claim:

1. Complex polymeric polyhydric alcohols which are polymeric polyether derivatives of dihydric phenols, which dihydric phenols are free from functional groups other than phenolic hydroxyl groups, said polyhydric alcohols having the following general formula $$R_3-[O-R-O-CH_2-CHOH-CH_2]_n-O-R-O-R_3$$

in which R is the hydroxyl-free nucleus of the dihydric phenol and $R_3$ is an aliphatic radical having at least one alcoholic hydroxyl group and free from other functional groups, and $n$ is at least 1, said polyhydric aclohols containing from 5 to 15 alcoholic hydroxyl groups per molecule and being free from other functional groups.

2. Complex polymeric polyhydric alcohols as defined in claim 1 which are polymeric polyether derivatives of p,p'dihydroxydiphenyl dimethyl methane.

3. Compositions containing the complex polymeric polyhydric alcohols of claim 1 together with a substantial amount of an aliphatic polyepoxide having at least two epoxide groups and free from functional groups other than epoxide and alcoholic hydroxyl groups.

4. Compositions containing the complex polymeric polyhydric alcohols of claim 1 together with a substantial amount of complex resinous epoxides which are polymeric polyether derivatives of dihydric phenols having terminal aliphatic epoxide groups and free from functional groups other than epoxide and alcoholic hydroxyl groups.

SYLVAN OWEN GREENLEE.

REFERENCES CITED

The following references are of record in the file of this patent:

UNITED STATES PATENTS

| Number | Name | Date |
|---|---|---|
| 2,060,715 | Arvin | Nov. 10, 1936 |
| 2,174,527 | Peterson | Oct. 3, 1939 |
| 2,213,477 | Steindorff et al. | Sept. 3, 1940 |
| 2,292,406 | Rothrock | Aug. 11, 1942 |
| 2,324,483 | Castan | July 20, 1943 |
| 2,411,029 | De Groote et al. | Nov. 12, 1946 |
| 2,503,726 | Greenlee | Apr. 11, 1950 |

FOREIGN PATENTS

| Number | Country | Date |
|---|---|---|
| 518,057 | Great Britain | Feb. 15, 1940 |